US009275392B2

(12) United States Patent
Potkonjak

(10) Patent No.: US 9,275,392 B2
(45) Date of Patent: Mar. 1, 2016

(54) PARKING FACILITY RESOURCE MANAGEMENT

(75) Inventor: Miodrag Potkonjak, Los Angeles, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 990 days.

(21) Appl. No.: 12/496,992

(22) Filed: Jul. 2, 2009

(65) Prior Publication Data

US 2011/0004507 A1 Jan. 6, 2011

(51) Int. Cl.
G07B 15/00 (2011.01)
G07B 15/02 (2011.01)
G06Q 30/02 (2012.01)
G06Q 10/06 (2012.01)
G08G 1/14 (2006.01)
G06Q 10/00 (2012.01)

(52) U.S. Cl.
CPC .......... *G06Q 30/02* (2013.01); *G06Q 10/06375* (2013.01); *G06Q 30/0284* (2013.01); *G08G 1/14* (2013.01)

(58) Field of Classification Search
CPC .................................................. G06Q 10/067
USPC .............................. 705/1.1, 400, 13, 348, 412
See application file for complete search history.

(56) References Cited

U.S. PATENT DOCUMENTS

| | | |
|---|---|---|
| 4,717,815 A | 1/1988 | Tomer |
| 4,880,097 A | 11/1989 | Speas |
| 5,442,348 A | 8/1995 | Mushell |
| 5,737,710 A | 4/1998 | Anthonoyson |
| 5,841,369 A | 11/1998 | Sutton et al. |
| 5,966,345 A | 10/1999 | Dee et al. |
| 6,109,418 A | 8/2000 | Yost |
| 6,111,522 A | 8/2000 | Hiltz et al. |
| 6,142,702 A | 11/2000 | Simmons |
| 6,230,868 B1 | 5/2001 | Tuxen et al. |

(Continued)

OTHER PUBLICATIONS

Night-Savertm, MJB Technologies, http://replay.waybackmachine.org/20080511222839/http://www.night-saver.com/areaandparkinglotlighting.html, May 11, 2008, retrieved Mar. 15, 2011.*

(Continued)

*Primary Examiner* — George Chen
(74) *Attorney, Agent, or Firm* — Turk IP Law, LLC

(57) ABSTRACT

Technologies are generally described for an information system configured to manage parking facility resources. The system can create and apply models and profiles regarding customers, parking space usage, access patterns, events, traffic, and other factors related to the parking facility. Parking facility operators may use the models to seek optimized revenues or profits. Increased revenue for parking facility operators may be supported by allocating resources to longer staying and better paying customers. New opportunities such as reselling, auctions, or options may further improve revenue generation for parking facilities. Customers may interface with the information system for availability queries, interactive reservation, and various other functions that may improve convenience, security, privacy, and service quality for the customers as well as for neighboring businesses and venues. Improved efficiency in parking facility resource consumption may reduce street traffic congestion. Parking security may be improved by adaptive lighting and camera operation.

20 Claims, 4 Drawing Sheets

(56) References Cited

U.S. PATENT DOCUMENTS

| | | | |
|---|---|---|---|
| 6,243,028 B1 | 6/2001 | Krygler et al. | |
| 6,309,098 B1 | 10/2001 | Wong | |
| 6,340,935 B1 | 1/2002 | Hall | |
| 6,747,575 B2 | 6/2004 | Chauvin et al. | |
| 6,885,312 B1 | 4/2005 | Kirkpatrick | |
| 6,889,899 B2 | 5/2005 | Silberberg | |
| 6,917,307 B2 | 7/2005 | Li | |
| 7,019,670 B2 | 3/2006 | Bahar | |
| 7,098,144 B2 | 8/2006 | Zhang et al. | |
| 7,106,214 B2 | 9/2006 | Jesadanont et al. | |
| 7,123,166 B1 * | 10/2006 | Haynes | G08G 1/14 340/932.2 |
| 7,237,716 B2 | 7/2007 | Silberberg | |
| 7,255,745 B2 | 8/2007 | Zhang et al. | |
| 2003/0075287 A1 | 4/2003 | Weik | |
| 2003/0097309 A1 | 5/2003 | Gibler et al. | |
| 2005/0280555 A1 * | 12/2005 | Warner | 340/932.2 |
| 2006/0105315 A1 * | 5/2006 | Shaver | 434/362 |
| 2006/0212344 A1 | 9/2006 | Marcus et al. | |
| 2007/0290888 A1 * | 12/2007 | Reif et al. | 340/932.2 |
| 2008/0059296 A1 * | 3/2008 | Schau | 705/14 |
| 2008/0291054 A1 | 11/2008 | Groft | |

OTHER PUBLICATIONS

Mary S. Smith, Crime Prevention through Environmental Design in Parking Facilities, http://www.fitch.ca/word/Crime%20Prevention%20-%20Parking%20Facilities.pdf, Apr. 1996, retrieved Mar. 15, 2011.*

Akyildiz, I., et al., "Wireless Sensor Networks: A Survey", 2002, Computer Networks, vol. 38, pp. 393-422.

Khattak, A., et al., "Effect of Parking Information on Travelers' Knowledge and Behavior", 1993, Transportation, vol. 20, pp. 373-393.

Maccubbin, R., et al., "Evaluating ITS Parking Management Strategies: A Systems Approach", May 2000, School of Engineering and Applied Science, University of Virginia, Charlottesville, Virginia, 93 pages.

Mainwaring, A. et al., "Wireless Sensor Networks for Habitat Monitoring", Sep. 28, 2002, WSNA '02, Atlanta, Georgia, 10 pages.

Meguerdichian, S., et al, "Coverage Problems in Wireless Ad-hoc Sensor Networks", Apr. 2001, IEEE Infocom 2001, vol. 3, pp. 1380-1387.

Meguerdichian, S., et al., "Exposure in Wireless Ad-hoc Sensor Networks", Jul. 2001, Proceedings of $7^{th}$ Annual International Conference on Mobile Computing and Networking (MobiCom '01), pp. 139-150.

Mouskos, K., et al., "Technical Solutions to Overcrowded Park and Ride Facilities", May 2007, Final Report: University Transportation Research Center—Region 2, The City College of New York, New York, 236 pages.

Rodier, C., et al., "Transit-Based Smart Parking in the San Francisco Bay Area: An Assessment of User Demand and Behavioral Effects", Apr. 1, 2005, Transportation Research Record, 18 pages.

Shaheen, S., et al., "Smart Parking Management Field Test: A Bay Area Rapid Transit (BART) District Parking Demonstration", 2005, Institute of Transportation Studies, University of California Davis, Research Report UCD-ITS-RR-05-02, 137 pages.

Slijepcevic, S., et al., "Power Efficient Organization of Wireless Sensor Networks", 2001, Proceedings of the IEEE International Conference on Communications 2001, Helsinki, Finland, 5 pages.

International Search Report dated Oct. 29, 2010 in International Application No. PCT/US10/37916.

Frank et al., "The impacts of mixed use and density on the utilization of three modes of travel: the single occupant vehicle, transit, and walking," 1994, Transportation Research Record 1466, pp. 44-52.

Hernandez-Velez, M. "Nanowires and 1D arrays fabrication: An Overview"; Thin Solid Films 495(1-2): 51-63, Jan. 2006. Abstract.

MacKenzie, et al. The Going Rate: What it Really Costs to Drive. Jun. 1992, World Resources Institute, Washington, DC.

Shoup, D., "An opportunity to reduce minimum parking requirements," Winter 1995, J. American Planning Association, 61(1): 14-28.

Surber, et al., "Effects of Ending Employer-Paid Parking for Solo Drivers,". Transportation Research Record, Issue No. 957, pp. 67-71. Abstract.

Shaheen, Susan, "Commuter-Based Carsharing: Market Niche Potentiai," Sep. 2, 2004, Transportation Research Record: Journal of the Transportation Research Board; vol. 1760; pp. 178-183.

Willson et al., "Parking Subsidies and Travel Choices: Assessing the Evidence," 1990, Transportation, 17, pp. 141-157.

Willson, R. "Estimating the Travel and Parking Demand Effects of Employer-Paid Parking," Mar. 1992, Regional Science and Urban Economics 22(1): 133-145.

Xia et al, "One-Dimensional Nanostructures: Synthesis, Characterization, and Applications," Mar. 4, 2003, Advanced Materials, 15(5): 353-389.

* cited by examiner

PARKING FACILITY RESOURCE MANAGEMENT

BACKGROUND

Parking facilities, such as parking decks and parking lots, can be an important economic resource for the owners and operators of the associated real estate. Parking facilities may also be key allied operations to affiliated or neighboring hotels, hospitals, residential areas, businesses, retail centers, sports venues, event locations, entertainment venues, or other such operations.

For parking customers, full information on the availability and pricing of various parking resources is not readily available. This lack of transparency complicates the market for, and consumption of, parking resources and may result in increased traffic, lost profits, or even avoidance of certain events or locations by consumers. For the managers of parking resources, a lack of detailed information regarding supply, demand, events, traffic, weather, and so on can complicate the establishment of optimal pricing. This can result in further lost profits.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
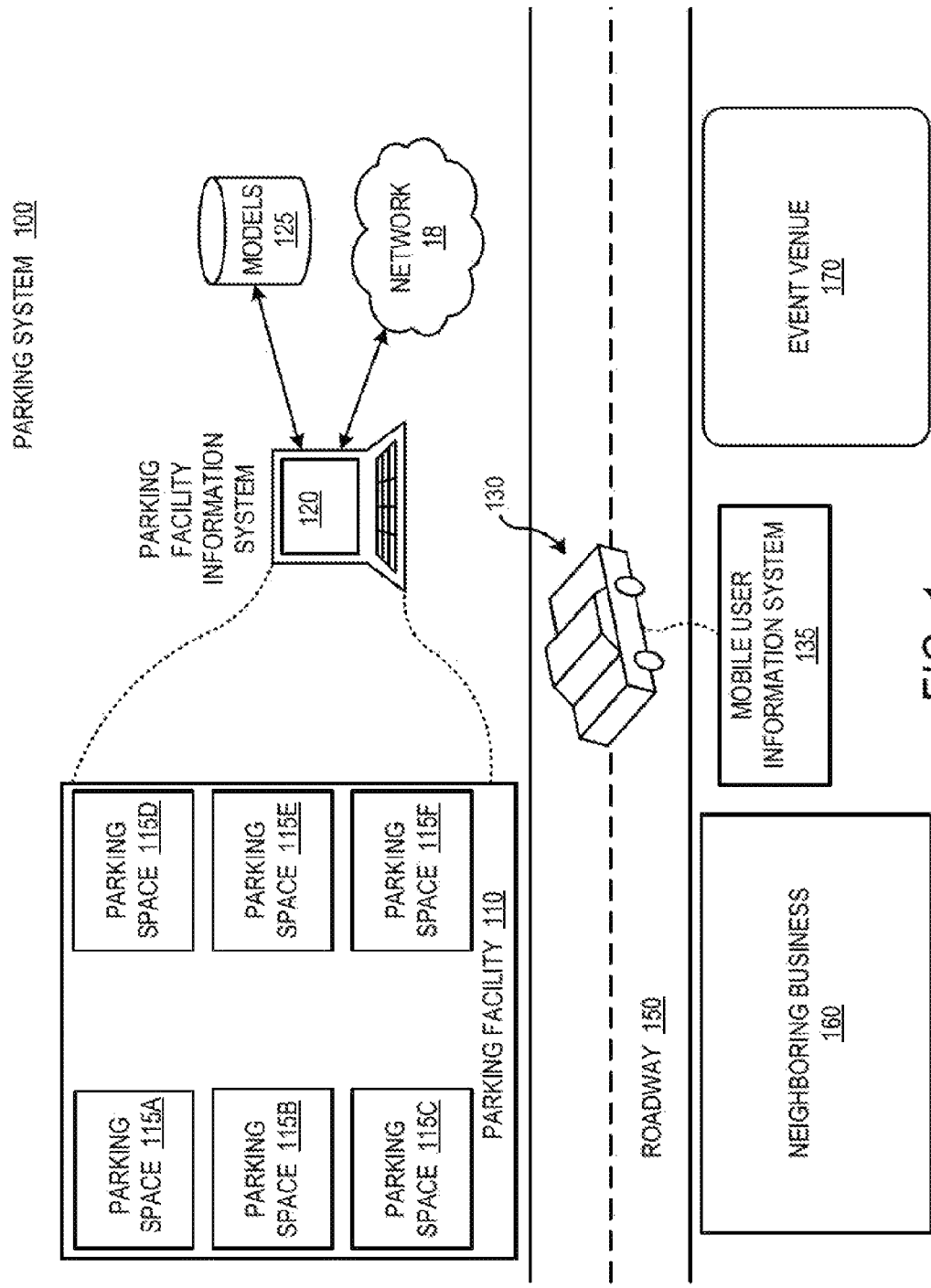
FIG. 1 is a block diagram illustrating a parking system with a parking facility and a parking facility information system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the present disclosure, as generally described herein, and illustrated in the figures can be arranged, substituted, combined, separated, and designed in a wide variety of different configurations, all of which are explicitly contemplated herein.

This disclosure is drawn to methods, apparatus, systems and computer program products related to information systems associated with parking facility resource management. An information system for managing parking facility resources can support creating and applying models and profiles for customers, space usage, access patterns, events, and other factors related to the parking facility resources. The models can operate in both time-dependent and time-independent regimes. The models may be used to conduct revenue or profit optimization for parking facility operators. Customer coordination, interactive reservation, and other parking facility information system functions may improve convenience, security, privacy, and service quality for customers and neighboring operations. Global positioning system (GPS) technology and wireless communication technology may be used by the parking facility information system. Improved efficiency in parking facility resource consumption may result in reduced street traffic congestion.

Increased revenue for parking facility operators may be supported by allocating resources to longer staying and better paying customers. New opportunities such as reselling, auctions, or options may further improve revenue generation for parking facilities. Parking security may be improved by adaptive lighting and camera operation. These safety operations may be coordinated with mobile phones and GPS technologies. Parking resources may be matched to customer needs to improve various quality of service metrics. Variants of maximum likelihood optimization in presence of uncertainty, or other optimization techniques, may be used to improve the quality of the service metrics. The information system may support organizing parking activities for large events.

Turning now to FIG. 1, a block diagram illustrates a parking system 100 with a parking facility 110 and a parking facility information system 120 according to one or more embodiments presented herein. A parking facility 110 can be a parking deck, parking lot, parking structure, street parking, distributed parking, any multiplicity thereof, or any combination thereof. The parking facility 110 can include any number of parking spaces 115A-115F. The parking facility 110 may be accessible by a roadway 150. The roadway 150 may be traveled by vehicles such as automobile 130, any other automobiles, other vehicles, or any combination thereof. The roadway 150 or area surrounding the roadway 150 may also support neighboring businesses 160, event venues 170, or other attractions. These businesses, attractions, and venues may draw parking customers and their automobiles 130 to the parking facility 110.

The automobile 130 may have an associated mobile user information system 135. The mobile user information system 135 may be an automobile-based information system, an in-dash information system, a GPS unit, a mobile telephone, a smartphone, a handheld computer, a computer terminal, or any other mechanism for accessing information networks or information systems. One such information system may be the parking facility information system 120.

The parking facility information system 120 may receive information from instrumentation associated with the parking spaces 115A-115F, access control mechanisms associated with the parking facility 110, input from an operator associated with the parking facility 110, or several other possible sources. The parking facility information system 120 may use, construct, or modify various models 125 of resources and usage associated with the parking facility 110. The models 125 and the related information may be used to simulate and project demand for resources associated with the parking facility 110. The models 125 may be stored in a database or other storage system associated with the parking facility information system 120. The parking facility information system 120 may interface to other systems using a network 18. The network 18 might comprise a wireless data network such as wireless Ethernet, or any mobile telephone or mobile data communication system.

The mobile user information system 135 may interface over the network 18 with the parking facility information system 120. The parking facility information system 120 may use information collected from instrumentation associated with the parking facility 110 to construct the models 125. The models 125 may also use information from users associated with automobiles 130, users associated with the mobile user information system 135, along with various other outside information sources. Other outside information may include local street traffic, foot traffic, weather, event schedules, and so forth.

The models 125 may also use information regarding user access demand, as a function of event schedules, day of the week, time of the day, traffic patterns, or various other factors. The models 125 may use supply and demand information may to establish pricing for resources associated with the parking facility 110. The models 125 may also project and establish availability of parking spaces 115A-115F for given time periods.

The models 125 associated with the parking facility information system 120 may attempt to optimize, or jointly optimize, for metrics related to revenue, profit, safety, efficiency, traffic, or other factors. Such optimization calculations may be conducted using statistical and heuristic techniques. For example, maximum likelihood principles or stochastic programming approaches may be employed. Time-dependent models can support conditional probabilities, such that that a particular scenario may occur a certain number of time units from now in response to another particular scenario occurring currently. The models 125 may be used in cyber-physical simulation techniques to optimize profit or quality of service for various operating scenarios.

Factors making up the models 125 may relate to various entities, or actors, such as customers, events, traffic, and resources. The models 125 can make special allowances for weekends and holidays. The models 125 may support the detection and handling of abandoned automobiles and other vehicles of special interest.

The models 125 may inform the parking facility information system 120 on allocating parking spaces 115A-115F according to a variety of criteria. The allocation criteria may include distance from outside destination, distance from most likely outside destination, congestion elimination, security improvement, and energy expense reduction for lighting, elevators, or other electrical resources.

Location information from GPS, or non-GPS sources may be used by automobiles 130, drivers, passengers, nearby business employees, parking enforcement employees, security enforcement personnel, car repair services, and other relevant entities or actors. Non-GPS location systems may include sensor networks, location discovery services, mobile phone triangulation, manual location entry, or various other approaches. Cameras, microphones, or various other sensors or detectors may provide inputs to data collection associated with the parking facility information system 120.

The models 125 may include factors related to neighboring businesses 160. The neighboring businesses 160 may impact the use of the parking facility 110 or may be impacted by the use of the parking facility 110. The models 125 may provide information to, or use information from, event venues 170 where customers of the event venues 170 may make use of the parking facility 110. The models 125 may include information relating to resources or features of the parking facility 110. These may include parking spaces 115A-115F, elevators, entrances, exits, and so forth.

The models 125 may collect, analyze, estimate, and project information about customers, usage, and demand. The models 125 may seek to optimize, or substantially optimize, a particular set of objectives while satisfying one or more constraints. Information profiles specific to individual customers may also be created and maintained for use by the models 125. General customer information may include factors for typical, current, and likely near future customers. Customer information may be leveraged to organize and conduct emergency responses associated with the parking facility 110. Individual customer profiles may include data regarding access times to a particular parking spaces 115A-115F. Customer profiles may also include known or estimated distances from the customer's office, home, or destination.

The parking facility information system 120 may also be used to deliver advertisement information about stores and other neighboring businesses 160 to parking customers or potential customers. One or more instances of the parking facility information system 120 can coordinate management of multiple or remote parking facilities 110.

The parking facility information system 120 can collect and coordinate various information sources or model 125 outcomes. For example, foot traffic trajectory planning may be used to as an input to pricing and resource allocation. Also, information regarding the parking facility 110 may be combined with other types of information such as the location of a particular seat within a stadium, the location of a store, or a facility such as a restroom.

Figure 2:
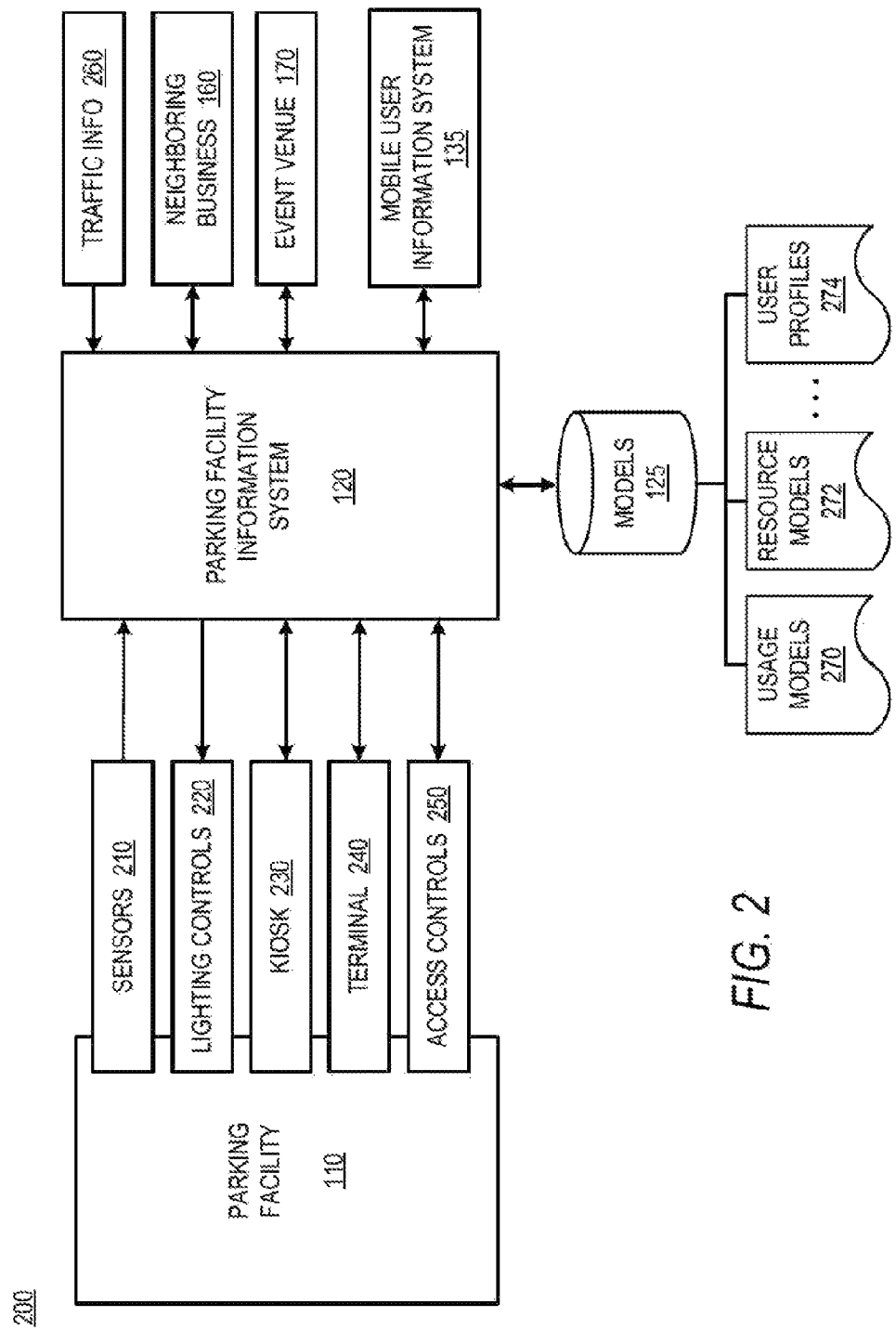
FIG. 2 is a block diagram illustrating a parking facility information system associated with a parking facility.

Turning now to FIG. 2, a block diagram 200 illustrates details of a parking facility information system 120 and an associated parking facility 110 according to some embodiments presented herein. The parking facility information system 120 can support interfaces to various other entities of information sources. These may include sensors 210, lighting controls 220, a kiosk 230, a terminal 240, access controls 250, traffic information sources 260, neighboring businesses 160, event venues 170, mobile user information systems 135, or any other entity that may interact with the parking facility information system 120.

Sensors 210, or other instrumentation associated with the parking facility 110, may provide information about usage and status of parking facility resources to the parking facility information system 120. The sensors 210 may include electromagnetic or load sensors to determine the usage of each parking space 115A-115F. The sensors 210 may include various other sensors, such as cameras or microphones. The lighting controls 220 associated with the parking facility 110 may receive lighting control commands from the parking facility information system 120. The lighting controls 220 may dim the lighting in areas of the parking facility 110 where there is little or no activity or usage of parking spaces 115A-115F. The lighting controls 220 may also increase illumination at parking spaces 115A-115F in response to those parking space resources being offered to or reserved by an automobile 130 entering the parking facility 110. As such, the lighting controls 220 may operate lights within the parking facility 110 so as to direct customers to specific parking facility resources.

A kiosk 230, or similar terminal, may be provided in association with the parking facility 110 for reservation of parking spaces 115A-115F or for payment of parking spaces 115A-115F. Such a kiosk 230 may interface with the parking facility information system 120 to provide information related to the users and usage of the parking facility 110. An operator associated with the parking facility 110 may have an operator terminal 240 for entering and receiving information from the parking facility information system 120. Access control mechanisms 250 associated with the parking facility 110 may also interface to the parking facility information system 120. Access control mechanisms 250 may provide information regarding entry or exit into the parking facility 110 to the parking facility information system 120. An access control module 250 may also request information from the parking facility information system 120 regarding accessibility, lists, or access control policies to be established with regard to the parking facility 110.

The parking facility information system 120 may build, employ, or update various usage, pricing, traffic, and other models 125. The models 125 may be stored in a database or any other information storage mechanism. The models 125 may support usage models 270, resource models 272, user profiles 274, and various other models, simulations, and datasets related to the resources and use of the parking facility 110. The parking facility information system 120 may receive information regarding local traffic 260. The traffic information 260 may include both foot traffic and vehicle traffic associated with automobiles 130 to determine factors associated with demand for the parking facility 110. Traffic congestion sensors can provide information for short-term and long-term projections within the parking facility information system 120. The parking facility information system 120 may create and maintain models 125 for local weather. Weather related information may be related or correlated with other models 125 for parking usage, traffic, or pricing. Weather related information may be obtained from a provider of such data.

An interface may be provided within the parking facility information system 120 for neighboring businesses 160 to provide information regarding events or high volume traffic expectations. The parking facility information system 120 can coordinate this information with its pricing and resource management models 125. For example, prices may be increased prior to a special event at a neighboring business 160. Similarly, an event venue 170 may use an interface provided by parking facility information system 120 to inform the parking facility information system 120 of events. The parking facility information system 120 may use information regarding upcoming events to reserve resources within the parking facility 110. The parking facility information system 120 may also use information regarding upcoming events to establish favorable pricing for parking spaces 115A-115F within the parking facility 110.

As discussed briefly above, the parking facility information system 120 may interface with a mobile user information system 135. The mobile user information system 135 may be used similarly to the kiosk 230 to check for available parking spaces 115A-115F, reserved parking spaces 115A-115F, pay for the use of parking spaces 115A-115F, or to perform other parking facility related tasks. The mobile user information system 135 may also be used to request assistance or emergency service via the parking facility information system 120. The mobile user information system 135 may be associated with a GPS, or non-GPS, positioning system to inform the parking facility information system 120 on the location of the associated automobile 130. For example, the parking facility information system 120 may use such location information to reserve or bill for a particular parking space 115A-115F associated with the parking facility 110 based upon location information provided by the mobile user information system 135 and its associated positioning system.

The parking facility information system 120 can maintain specific customer profiles, also known as user profiles 274. A customer profile may inform a customer model concerning the habits and priorities for that customer. Such a model 125 can provide information about the most likely behavior of the customer under a given scenario. The model 125 may also estimate the probability that the customer will take a particular action under a particular set of conditions that may be measured or calculated. Generalization from the models 125 concerning customers can combine the preferences of all customers or a subset of customers. Customer profile information may be used for congestion management associated with the parking facility 110. The congestion management may apply inside or outside the parking facility 110.

Customer information or customer profiles may be analyzed for various system improvements or optimizations. For example, assignment and scheduling operations may use customer information. Stack parking optimization may use customer information. Optimization of long-term parking and other reservations may use customer information. Customer information may inform the optimization of arrival and departure time windows for events. Efficiently organizing matches for car pool may use customer information. Customer information may be used to organize parking reservations and negotiations. Event and long-term parking capacity planning may use customer information. Typical customers, their profiles, and trends in their profiles may be analyzed to allocate resources such as work force, sensing, communication equipment, and lightning. Such allocation may be projected for a certain period or may be made dynamically.

The parking facility information system 120 can support revenue improvement, or maximization, through the creation and application of specific services and contracting opportunities. For example, progressive profile-driven pricing scales may vary as the length of a resource reservation increases. Also, customized contract term renewal policies may be supported. Option contracts may be used to buy or sell a right to park at a specific location or subset of parking spaces. Customers or intermediates may resell parking rights. Auctions may be available for the brokering of parking rights. The winners of auctions may be announced at specific times or continuously. Immediate sales or auctions may support the renting of parking spaces in conjunction with selling one or more other products such as movie theatre tickets or sporting event tickets.

The parking facility information system 120 can support the reservation of parking spaces 115A-115F. Reservation prices may be variable for different types of reservations in terms of duration, certainty, and other relevant parameters. Parking access may be sold where the customer can improve the security level of their vehicle and possessions by requesting addition camera or sensor monitoring. The customer may request additional security using any mobile user information system 135, such as their mobile telephone.

Figure 3:
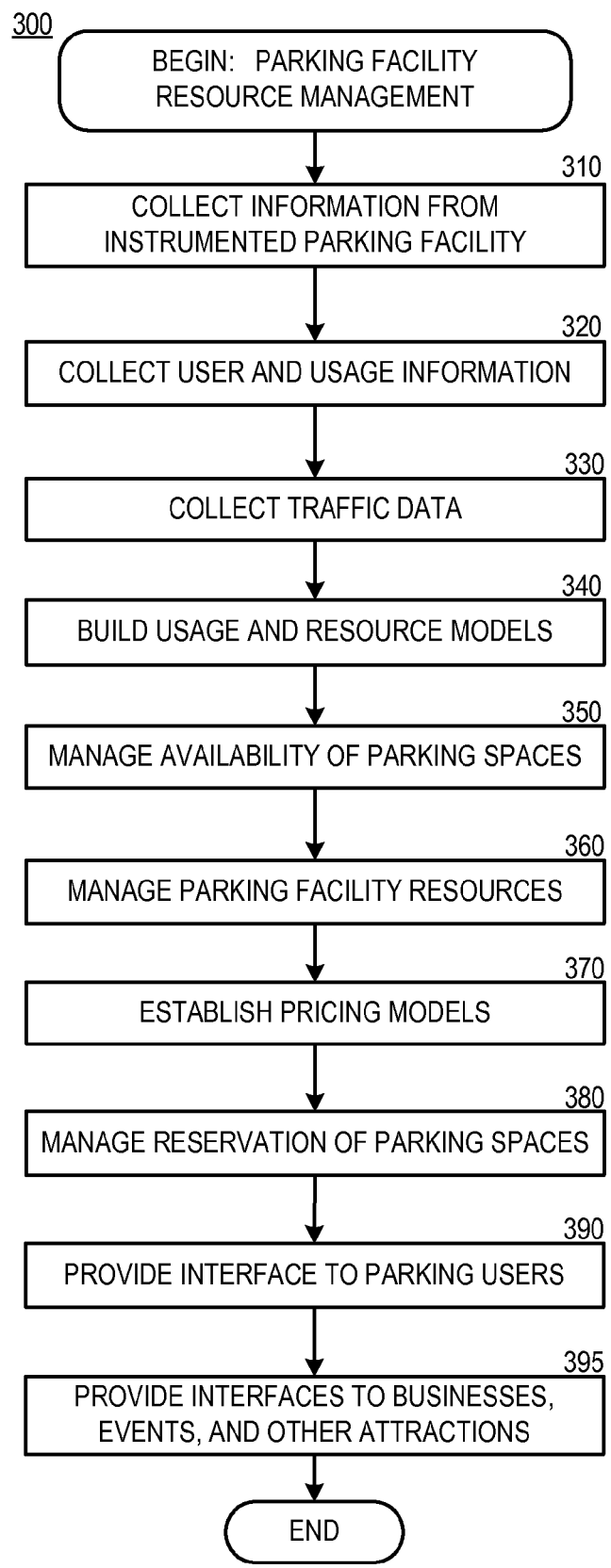
FIG. 3 is a flow diagram illustrating a process for parking facility resource management.

Referring now to FIG. 3, additional details will be provided regarding the embodiments presented herein for information systems associated with parking resource management. In particular, FIG. 3 is a flow diagram illustrating a process 300 for parking facility resource management according to at least some embodiments presented herein.

It should be appreciated that the operations described herein are implemented as a sequence of operational or manufacturing acts, as a sequence of computer implemented acts or program modules running on a computing system, or as interconnected machine logic circuits or circuit modules within the computing system. The implementation is a matter of choice dependent on the performance and other requirements of the various embodiments. Some of the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

The process 300 begins at operation 310, where the parking facility information system 120 can collect information from an instrumented parking facility 110. As discussed above, the instrumentation associated with the parking facility 110 may include sensors, operator inputs, cameras, GPS location systems, electromagnetic sensors, card readers, proximity sensors, proximity card readers, magnetic strip card readers, any other mechanism for collecting information concerning the access and usage of parking facility 110, or any combination thereof.

Continuing to operation 320, the parking facility information system 120 can collect user and usage information. The user and usage information may concern demand, time patterns, and other usage characteristics of the parking facility 110. User information may be collected into user profiles for specific users. User information may also be aggregated into probabilistic models for typical users or typical users having certain characteristics.

Continuing to operation 330, the parking facility information system 120 may collect or obtain traffic data. The traffic data may concern the traffic of automobiles 130 on the roadway 150 and other surrounding streets or roadways near the parking facility 110. The traffic information may also include foot traffic associated with certain times and days, commute times, and events.

Continuing to operation 340, the parking facility information system 120 may build usage and resource models 125 using data collected in operations 310, 320, and 330 as well as other information collected by the parking facility information system 120. The models 125 may be used to project demand and usage patterns for the parking facility 110 and thus establish pricing models and pricing patterns for the parking facility 110.

Continuing to operation 350, the parking facility information system 120 can manage the availability of parking spaces. The parking facility information system 120 can hold parking spaces 115A-115F in reserve or specifically make the parking spaces 115A-115F available. Pricing related to the parking spaces 115A-115F may also be modified based upon usage and resource models associated with the parking facility 110.

Continuing to operation 360, the parking facility information system 120 can manage various parking facility resources. Parking facility resources may include lighting, access controls, gates, doors, elevators, stairwells, security systems, fire control systems, terminals, kiosks, payment centers, electronic signage, and any other system or feature associated with the parking facility 110.

Continuing to operation 370, the parking facility information system 120 may establish price points and pricing models for the parking spaces 115A-115F within the parking facility 110. The price points and pricing models may be established by the parking facility information system 120 based upon the models 125 as established in operation 340. For example, prices may be increased in time periods where one or more of the models 125 project an increase in demand for parking resources.

Continuing to operation 380, the reservation of parking spaces 115A-115F may be managed by the parking facility information system 120. Reservation requests may be received by the parking facility information system 120 by any type or number of terminals accessing the parking facility information system 120 over the network 18. Reservation or reservation requests may also access the parking facility information system 120 from mobile user information systems 135 associated with automobiles 130. For example, a user may reserve a parking space 115A-115F using a mobile telephone or smart phone.

Continuing to operation 390, the parking facility information system 120 may provide one or more interfaces to parking users. The provided interface may relate to the mobile user information system 135, the kiosk 230, an operator terminal 240, or any other mechanism for interfacing between a parking user and the parking facility information system 120. Continuing to operation 395, the parking facility information system 120 may provide interfaces to businesses, events, or other attractions.

Figure 4:
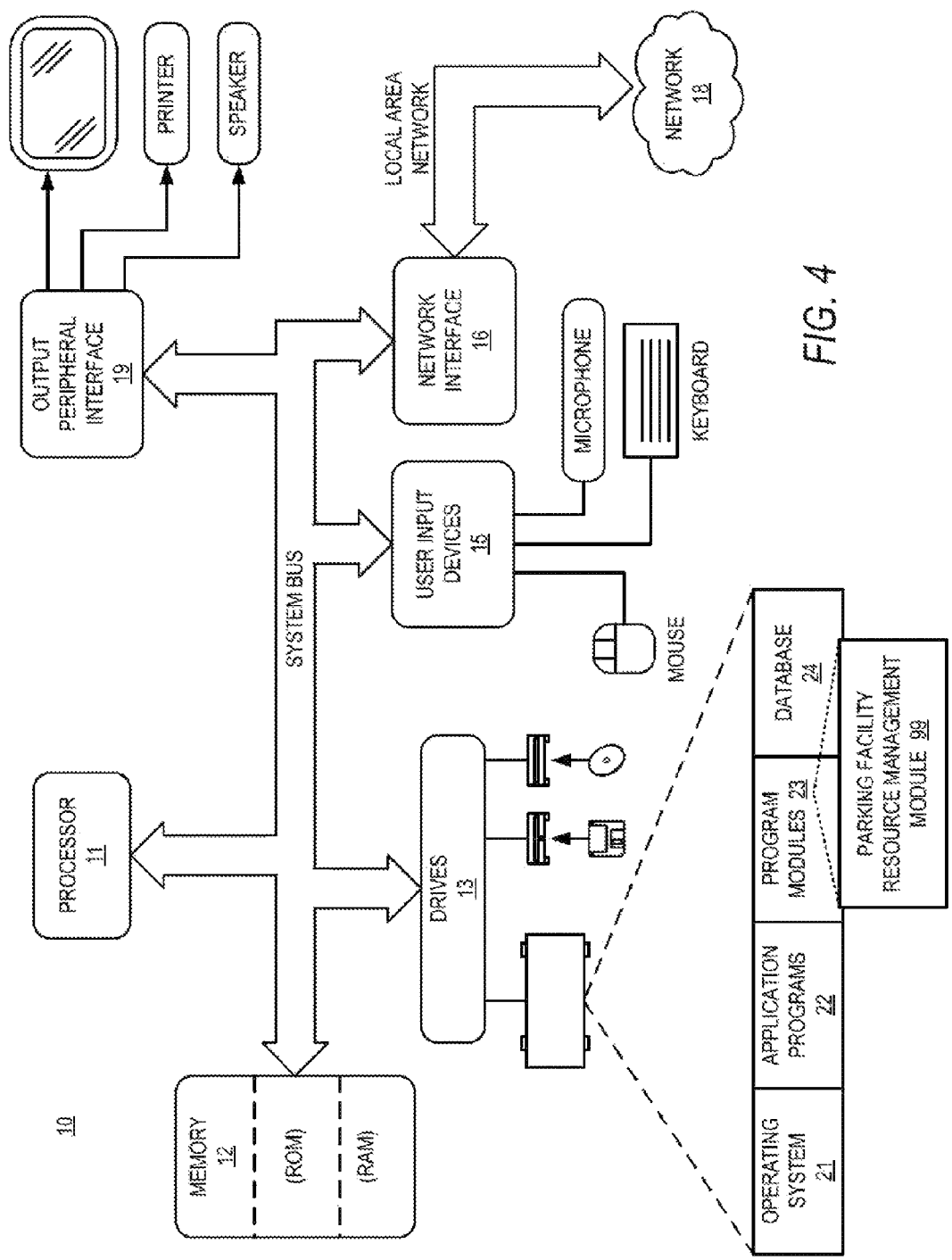
FIG. 4 is a block diagram illustrating an exemplary computing system, all arranged according to embodiments presented herein.

With reference to FIG. 4, an exemplary computing system is illustrated for implementing various embodiments. The computing system can support embodiments for implementing parking facility resource management. For example, the computing system can comprise a program module 23 such as a parking facility resource management module 99. Various embodiments may include computers, dedicated hardware, or embedded computing systems. For example, elements of the illustrated computing system may be used as, or embedded into, the parking facility information system 120 or the mobile user information system 135.

The computing system includes a computer 10. The computer 10 can include a processor 11, a memory 12 and one or more drives 13. The drives 13 and their associated computer storage media can provide storage of computer readable instructions, data structures, program modules 23 and other data for the computer 10. The computer 10 may be implemented as a conventional computer system, an embedded control computer, a laptop, or a server computer, a mobile device, a set-top box, a kiosk, a vehicular information system, a mobile telephone, a customized machine, or other hardware platform. The processor 11 may be a general purpose processor, a processor core, a multiprocessor, a multi-core processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof.

The drives 13, other storage devices, or their associated computer-readable storage media can store an operating system 21, application programs 22, program modules 23, and a database 24. The computer 10 can include user input devices 15 through which a user may enter commands and data. Input devices can include an electronic digitizer, a microphone, a keyboard, a pointing device, or any combination thereof. Examples of pointing devices may include a mouse, trackball, light pen, touch screen, or touch pad. Other input devices to the computer 10 may include a joystick, game pad, satellite dish, scanner, or the like. Input devices can be connected to processor 11 through a user input interface that is coupled to a system bus. The input devices may also be connected by other interface and bus structures, such as a parallel port, game port or a universal serial bus (USB). Computers such as computer 10 may also include other peripheral output devices such as speakers, which may be connected through an output peripheral interface 19 or similar interface.

The computer 10 may operate in a networked environment using logical connections to one or more computers, such as a remote computer connected to network interface 16. The remote computer may be a personal computer, a server, a router, a network PC, a peer device, or other common network node. The remote computer can include many or all of the elements described herein relative to the computer 10. Networking environments may include networks wireless area network (WAN), local area networks (LAN), intranets, the Internet, or combinations thereof.

When used in a LAN or wireless LAN (WLAN) networking environment, the computer 10 may be connected to the LAN through a network interface 16 or a network adapter. When used in a WAN networking environment, the computer 10 can include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used.

According to one or more embodiments, computer 10 may be configured such that the processor 11 and/or program modules 23 can perform parking facility resource management in accordance with embodiments presented herein. The computer 10 may include one or more instances of a physical computer-readable storage medium or media associated with drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or nonvolatile memory technology. The media may also represent secondary storage, whether implemented as the storage drives 13 or otherwise. Hard drive implementations may be characterized as solid state, or may include rotating media storing magnetically-encoded information.

The storage media may include one or more program modules 23 such as a parking facility resource management module 99. The program modules 23 may include software instructions that, when loaded into the processor 11 and executed, transform a general-purpose computing system into a special-purpose computing system customized to facilitate all, or part of, the parking facility resource management techniques disclosed herein. As detailed throughout this description, the program modules 23 may provide various tools or techniques by which the computer 10 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine. Such a machine may be transformed to a second machine, or specific machine by loading executable instructions contained within the program modules 23. These computer-executable instructions may transform the processor 11 by specifying how the processor 11 transitions between states, thereby transforming the transistors or other circuit elements constituting the processor 11 from a first machine to a second machine, wherein the second machine may be specifically configured to support parking facility resource management. The states of either machine may also be transformed by receiving input from one or more user input devices 15, network interfaces 16, other peripherals, other interfaces, or one or more users or other actors. Either machine may also transform states, or various physical characteristics of various output devices such as printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 23 may transform the physical state of the semiconductor memory 12 when the software is encoded therein. For example, the software may transform the state of transistors, capacitors, or other discrete circuit elements constituting the semiconductor memory 12.

As another example, the storage media may be implemented using magnetic or optical technology such as drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A non-transitory computer-readable storage medium with instructions stored thereon to manage a parking facility, the instructions comprising:

collecting usage information related to one or more of a traffic pattern, a day of a week, a time of a day, and a usage of parking spaces for the parking facility;

collecting resource information related to electrical resources within the parking facility;

building usage models for the parking facility based on the collected usage information and based on information collected from a Global Positioning System (GPS) unit;

building resource models for the parking facility based on the collected resource information and based on the information collected from GPS unit, wherein the information collected from the GPS unit determines user access demand as a function of one or more of the day of the week, the time of the day, and the traffic pattern;

managing allocation of the parking spaces based on the usage models;

reducing energy expense by a management operation of the electrical resources based on the resource models and the usage models, wherein the management operation of the electrical resources includes a dimming action to dim the parking spaces determined to have little or no activity based on the usage models and an illumination action to increase illumination of the parking spaces reserved by customers based on the usage models to direct the customers to the illuminated parking spaces; and establishing prices for the parking spaces based on the usage models.

2. The non-transitory computer-readable storage medium of claim 1, wherein the instructions further comprise:

providing an interface to parking customers.

3. The non-transitory computer-readable storage medium of claim 2, wherein the interface to parking customers further comprises an interface for mobile telephones.

4. The non-transitory computer-readable storage medium of claim 1, wherein the instructions further comprise:

providing an interface to neighboring businesses; and receiving upcoming event information from the neighboring businesses via the interface, wherein building the usage models for the parking facility based on the collected usage information includes a build action to build the usage models for the parking facility based on the collected usage information and the upcoming event information.

5. The non-transitory computer-readable storage medium of claim 1, wherein the traffic information comprises foot traffic information.

6. A parking facility management system comprising: a memory; and a processor coupled to the memory, the processor configured to:

collect usage information related to one or more of a traffic pattern, a day of a week, a time of a day, and a usage of parking spaces for the parking facility;

collect resource information related to electrical resources within the parking facility;

collect user information related to customers of the parking facility;

identify usage models for the parking facility based on the collected usage information and based on information collected from a Global Positioning System (GPS) unit;

identify resource models to reduce energy expense of the parking facility based on the collected resource information and based on the information collected from the GPS unit, wherein the information collected from the GPS unit determines user access demand as a function of one or more of the day of the week, the time of the day, and the traffic pattern;

identify user profiles for the customers based on the collected user information;

manage allocation of the parking spaces based on the usage models and the user profiles;

reduce energy expense by a management operation of the electrical resources to reduce energy expense based on the resource models and the usage models, wherein the management operation of the electrical resources includes a dimming action to dim the parking spaces determined to have little or no activity based on the usage models and an illumination action to illuminate of the parking spaces that are reserved by customers based on the usage models to direct the customers to the illuminated parking spaces; and establish prices for the parking spaces based on the usage models.

7. The parking facility management system of claim 6, wherein the processor is further configured to provide an interface to parking customers.

8. The parking facility management system of claim 7, wherein the interface to parking customers includes an interface for mobile telephones.

9. The parking facility management system of claim 6, wherein the processor is further configured to cause increased security to be provided upon request from one of the customers of the parking facility.

10. The parking facility management system of claim 9, wherein to cause increased security to be provided upon request from one of the customers of the parking facility, the processor is further configured to:

initiate additional camera monitoring of parking spaces associated with the one of the customers in response to the request; and initiate microphone monitoring of the parking spaces associated with the one of the customers in response to the request.

11. The parking facility management system of claim 6, wherein the processor is further configured to:

provide an interlace to an event venue that is independent of the parking facility; and receive upcoming event information from the event venue via the interface, the upcoming event information specifies a time when an event is held at the event venue, wherein to identity the usage models for the parking facility based upon the collected usage information, the processor is further configured to identify the usage models for the parking facility based on the collected usage information and the upcoming event information, and wherein the usage models indicate higher demand of the parking facility during the time when the event is held at the event venue.

12. The parking facility management system of claim 6, wherein the processor is further configured to collect traffic information.

13. The parking facility management system of claim 6, wherein the processor is further configured to create user profiles for inclusion into the usage models.

14. A method executed by a user input device to manage a parking facility, the method comprising:

collecting usage information related to one or more of a traffic pattern, a day of a week, a time of a day, and a usage of parking spaces for the parking facility;

collecting resource information related to electrical resources within the parking facility, wherein the electrical resources include lighting resources and elevators within the parking facility;

identifying usage models for the parking facility based on the collected usage information and based on information collected from a Global Positioning System (GPS) unit;

identifying resource models for the parking facility based on the collected resource information and based on the information collected from the GPS unit, wherein the information collected from the GPS unit determines user access demand as a function of one or more of the day of the week, the time of the day, and the traffic pattern;

reducing energy expense by managing operation of the electrical resources based on the resource models and the usage models, wherein managing operation of the electrical resources includes a dimming action to dim the parking spaces having little or no activity according to the usage models and an illumination action to illuminate the parking spaces that are reserved by customers according to the usage models for directing the customers to the illuminated parking spaces; and establishing prices for the parking spaces based on the usage models and the resource models.

15. The method of claim 14, further comprising:
managing allocation of the parking spaces within the parking facility based on the resource models.

16. The method of claim 14, further comprising:
providing an interface to parking customers.

17. The method of claim 14, further comprising:
providing an interlace to neighboring businesses that are neighboring the parking facility and independent from the parking facility; and receiving upcoming event information from the neighboring businesses via the interface, wherein the upcoming event information specifies a time when events are held by the neighboring businesses, wherein identifying the usage models for the parking facility based on the collected usage information includes an identification action to identify the usage models for the parking facility based on the collected usage information and the upcoming event information, and wherein the usage models indicate higher demand of the parking facility during the time when the events are held by the neighboring businesses.

18. The method of claim 14, further comprising:
collecting traffic information for inclusion into the resource models.

19. The method of claim 14, further comprising:
creating user profiles for inclusion into the resource models.

20. The method of claim 14, wherein reducing energy expense by managing operation of the electrical resources based on the resource models and the usage models includes:
enabling and disabling operation of the elevators to reduce energy utilization based on the usage models.

* * * * *